United States Patent
Stone

(10) Patent No.: US 7,139,463 B2
(45) Date of Patent: Nov. 21, 2006

(54) COMPOSITIONS AND DEVICES FOR THERMOOPTICALLY CONTROLLED SWITCHING AND FILTERING

(75) Inventor: David S. Stone, Marion, MA (US)

(73) Assignee: Lightspan, LLC, Wareham, MA (US)

( * ) Notice: Subject to any disclaimer, the term of this patent is extended or adjusted under 35 U.S.C. 154(b) by 372 days.

(21) Appl. No.: 10/625,183

(22) Filed: Jul. 23, 2003

(65) Prior Publication Data
US 2004/0126082 A1 Jul. 1, 2004

Related U.S. Application Data

(62) Division of application No. 10/015,362, filed on Dec. 12, 2001, now Pat. No. 6,654,188.

(51) Int. Cl.
*G02F 1/17* (2006.01)
*C08J 3/02* (2006.01)

(52) U.S. Cl. .......................... 385/141; 385/147; 385/4; 106/271; 252/583

(58) Field of Classification Search ........ 385/141–145, 385/147, 4; 106/270–272; 252/582–589
See application file for complete search history.

(56) References Cited

U.S. PATENT DOCUMENTS

| | | | |
|---|---|---|---|
| 3,996,187 A | 12/1976 | Travnicek | 260/37 |
| 4,418,165 A | 11/1983 | Polmanteer et al. | 523/210 |
| 4,906,696 A | 3/1990 | Fischer et al. | 525/148 |
| 4,984,870 A | 1/1991 | Herbrechtsmeier et al. | 350/96.34 |
| 5,266,352 A | 11/1993 | Filas et al. | 427/163 |
| 5,307,438 A | 4/1994 | Bilkadi et al. | 385/141 |
| 5,404,245 A * | 4/1995 | Chahroudi | 359/289 |
| 5,418,640 A | 5/1995 | Hood | 359/265 |
| 5,588,083 A | 12/1996 | Boonstra et al. | 385/122 |
| 5,658,966 A | 8/1997 | Tsukamoto et al. | 522/99 |
| 5,661,210 A | 8/1997 | Burns et al. | 524/493 |
| 5,692,088 A | 11/1997 | Ishiharada et al. | 385/125 |
| 5,783,115 A | 7/1998 | Bilkadi et al. | 252/582 |
| 5,902,715 A | 5/1999 | Tsukamoto et al. | 430/290 |
| 6,165,389 A | 12/2000 | Asher et al. | 252/582 |
| 6,166,125 A | 12/2000 | Sugiyama et al. | 524/462 |

(Continued)

FOREIGN PATENT DOCUMENTS

WO    WO98/37445    8/1998

OTHER PUBLICATIONS

L. Eldada and L. Shacklette,"Advances in Polymer Integrated Optics",IEEE J. Selectted Topics in Quantum Electronics, v.6, No. 1, pp. 54-68, Jan./Feb. 2000.

(Continued)

*Primary Examiner*—Sung Pak
*Assistant Examiner*—Jerry T. Rahll
(74) *Attorney, Agent, or Firm*—Barlow, Josephs & Holmes, Ltd.

(57) ABSTRACT

The invention relates to polymer compositions which enable thermooptic control of signal attenuation in the ultraviolet, visible and near infrared (NIR) regions of the electromagnetic spectrum, and devices incorporating such compositions. The compositions are derived from polymer mixtures which exhibit a cloud point phase transition at a temperature in the range of a thermooptically controlled device such as a programmable waveguide attenuator, a programmable neutral density filter, or an optically absorbent switch. An especially preferred embodiment of the invention comprises a mixture of a high molecular weight chlorotrifluoroethylene fluid and a wax with an "ON-state" insertion loss of below 0.1 dB/cm and an extinction ratio of 22 dB/cm in the 1550 nm NIR telecommunication band.

18 Claims, 2 Drawing Sheets

U.S. PATENT DOCUMENTS

| | | | | |
|---|---|---|---|---|
| 6,166,156 | A | 12/2000 | Wu et al. | 526/245 |
| 6,229,949 | B1 | 5/2001 | Ido et al. | 385/145 |
| 6,246,809 | B1 | 6/2001 | Jouanno et al. | 385/22 |
| 6,262,706 | B1 | 7/2001 | Albert et al. | 345/107 |
| 6,266,460 | B1 | 7/2001 | Doerr | 385/16 |
| 6,266,475 | B1 | 7/2001 | Suzuki et al. | 385/145 |
| 6,277,147 | B1 | 8/2001 | Christ et al. | 623/6.56 |
| 6,362,303 | B1 * | 3/2002 | Byker et al. | 528/76 |
| 6,654,188 | B1 | 11/2003 | Stone | 359/888 |

OTHER PUBLICATIONS

H. Erlig and H. Fetterman,"Polymer Modulators for the 40-Gbit/sec Market", Lightwave, pp. 175-176, Aug. 2001.

T.Sakata,H.Togo,M.Makihara,F.Shimokawa,K. Kaneko,"Improvement of Switching Time in a Thermocapillarity Optical Switch", J. Lightwave Technol.,v.19, No. 7,Jul. 2001,pp. 1023-1027.

J.Kobayashi,T. Matsuura,Y.Hida,S.Sasaki,T.Maruno,"Fluorinated Polyimide Waveguides with Low Polarization-Dependent Loss and Their Applications to Thermooptic Switches", J. Lightwave Technol., v. 16, No. 6, pp. 1024-1029, Jun. 1998.

P.Bessette and D. Stone, "Synthetic Grease" in Synthetic Lubricants and High Performance Functional Fluids, 2nd ed.,L.Rudnick and M.Shubkin,eds.,Marcel Dekker,Inc.,NY ,1999.

ASTM D-5771,"Standard TEst Method for Cloud Point of Petroleum Products (Optical Detection Stepped Cooling Method)",available from American Society of Testing and Materials, 100 Barr Harbor Drive, West Conshohocken, PA 19428-2959.

D.Stone and P.Bessette,"Liquid Lubricants",in Space Vehicle Mechanism:Elements of Successful Design, P.Conley, ed.,John Wiley & Sons,Inc., New York, 1998.

* cited by examiner

WAVEGUIDE ATTENUATOR

NEUTRAL DENSITY FILTER

COMPOSITIONS AND DEVICES FOR THERMOOPTICALLY CONTROLLED SWITCHING AND FILTERING

CROSS REFERENCE TO RELATED APPLICATIONS

This application is a divisional application of and claims priority from earlier filed U.S. patent application Ser. No. 10/015,362, filed Dec. 12, 2001, now issued as U.S. Pat. No. 6,654,188, the contents of which are incorporated herein by reference.

BACKGROUND AND SUMMARY OF THE INVENTION

The present invention relates to the field of thermooptically active materials used in optical components and technology. More particularly, the present invention relates to the fields of optical waveguides, optical filters, optical switches, laser optics, neutral density filters, optical attenuators, flat panel displays, and projection display devices.

A persistent difficulty in the field of optical polymer materials is the high attenuation of such materials when they are in their inactive, or maximally transmissive state, sometimes denoted the "ON-state". For example, many polymer plastics have been developed for use in passive optical waveguides for telecommunication signals in the near infrared (NIR), particularly at 1300 nm and 1550 nm. Even though such polymers are intended to be optimally transmissive at all times (i.e. always in their ON-state), attenuation levels of up to 0.5 dB/cm are typical for conventional "low loss" materials. The absorption in such polymers is usually due to the presence of carbon-hydrogen bonds that exhibit strongly absorbing anharmonic vibrational resonance overtone bands in the NIR. The halogenated analogs of carbon-hydrogen polymers, wherein the hydrogen is substituted by a higher mass halogen such as fluorine, bromine, iodine, or chlorine, exhibit much weaker NIR absorption and are therefore more highly transmissive. Halogenated polymers have been tested as passive waveguide media that exhibit improved attenuation levels of under 0.1 dB/cm. In an embodiment of the present invention, preferred for applications in the NIR, the composition comprises halogenated polymers in order to realize low attenuation.

So-called "active" polymers are used in optics in order to manipulate characteristics of optical signals by means of external control inputs, which affect the optical properties of the polymers. The polymer compositions are suitable for use in thermooptically active optical components because of their large thermooptic coefficient for the index of refraction, dn/dT, or rate of change of refractive index with temperature. In an example of an electro optically active polymer composition for use in an optical component, radio frequency (rf) electrical control inputs, rather than thermal inputs, are used to allow high-speed phase modulation of optical signals propagating within the polymer. An important figure of merit for any such actively controlled polymer medium is that it have minimal total absorption when switched to the ON-state. Ideally, it will have the best achievable ON-state absorption performance for the passive polymer media mentioned above, or a figure of merit, usually denoted in the art as "insertion loss", of less than 0.1 dB/cm.

The expected absorption for the prior art electrooptically controlled chromophoric polymers is at least 10 dB for a 1 cm active polymer length or an insertion loss of 10 dB/cm. These materials, when used in a Mach-Zehnder interferometer configuration can provide a maximum absorption in the OFF-state of 30 dB. The difference in these two attenuation levels is a second important figure of merit for any switched medium, denoted the "extinction ratio". In this case, the difference between the maximum OFF-state absorption and the minimum ON-state absorption yields an extinction ratio of 20 dB. Since their device has an active polymer length of 1 cm, their extinction ratio per unit length is 20 dB/cm. Extinction ratio performance for the present invention was measured to be 22 dB/cm, a level equal to or improved over prior art media.

Other optical switches described in the prior art are comprised of thermooptically controlled polymer materials that exhibit insertion loss of 0.6 dB/cm and are limited to an extinction ratio of 20 dB total. In the prior art, U.S. Pat. No. 6,208,798 discloses a polymer cladding that is thermooptically controlled to permit leakage and hence attenuation of optical signals from the waveguide core; a preferred embodiment is described wherein the insertion loss is 3 dB for a design which provides an extinction ratio of 20 dB. The materials of the present invention, when configured as the core of a simple thermooptically controlled waveguide, rather than the more complex configuration of a Y-branch waveguide, a Mach-Zehnder interferometer, or a thermooptically controlled leaky waveguide cladding, would provide an insertion loss of below 0.1 dB/cm and 22 dB of extinction ratio for every centimeter of waveguide length. Thus, the present invention promises a significant reduction in complexity, and a substantial improvement in performance for thermooptically controlled devices over that of the prior art.

A further advantage of the present invention is that it exhibits a high thermooptic control coefficient. That is, for a modest change in the control parameter (temperature), a large change in signal attenuation is realized. The measured thermooptic control coefficient for compositions of the present invention is in the range of 6 dB/cm/° C. When combined with the low insertion loss of the present invention of less than 0.1 dB/cm, this figure of merit implies that for a relatively small change in temperature along a waveguide, a relatively large change in attenuation can be achieved. For example, a ten-centimeter long waveguide attenuator using a composition of the present invention would exhibit an insertion loss of 1 dB and 60 dB/° C. thermooptic coefficient. So, with a control temperature change of only 0.2° C., such a device could switch 10 dB in attenuation. Allowing such a small change in temperature is a significant advantage over the prior art because it permits, for a given thermooptic heating/cooling power per unit length, a more rapid switching speed in any device utilizing compositions of the invention.

Yet another advantage of the present invention is that it enables design of components that have attenuation that is smoothly varying and varies only gradually across its wavelengths of operation. Some thermooptically controlled devices must be optimized for performance in narrow bands of spectrum because their attenuation performance relies on resonance or nulling phenomena. For example, devices which rely on the thermooptic change of refractive index of a polymer waveguide arm of a Mach-Zehnder interferometer must be optimized for a center wavelength. Variation of operating wavelength by more than one quarter of the center wavelength value renders the device unable to achieve its ideal phase cancellation point. In the prior art disclosed in U.S. Pat. No. 6,165,389, a switching medium is described which depends on a volume phase transition phenomenon in the thermooptically active material; a preferred embodiment exhibits variation in optical absorption which is strongly resonant in wavelength. By contrast to the foregoing prior art examples, the present invention relies on bulk absorption due to a "cloud point" phase transition phenomenon; in addition, its absorption characteristics vary only slowly across the entire wavelength band from 300 nm to 2000 nm without any rapidly varying resonance attenuation features. Using compositions of the present invention, devices can be configured which exhibit only small changes in optical absorption across wavelength, which we denote "insertion loss flatness". A preferred embodiment of the invention, for example, achieves a worst case insertion loss flatness of less than 0.01 dB/nm in the vicinity of NIR telecommunication bands over the wavelength range of 1200 nm to 1600 nm.

A further characteristic of some optical polymer media such as liquid crystal polymer media is that they exhibit birefringence, meaning that their index of refraction is significantly different for the two orthogonal signal polarizations. This in turn leads to a deleterious feature known as polarization dependent loss (PDL). In some applications such as polarization independent waveguide switches, or free space neutral density filters, it would be desirable to realize behavior for a switch medium that is non-birefringent in nature and exhibits minimal PDL. The cloud point mechanism which gives the present invention its switching characteristics is intrinsically non-birefringent in nature and may therefore be advantageous in such applications.

The composition of the present invention may be used to fill an optical waveguide structure. Such structures are commonly designed to ensure propagation in a single waveguide mode. There are structures used in the telecommunications field, which are also based on propagation of multiple modes, known as multimode waveguides. The compositions of the present invention may be used to fill both single mode and multimode waveguide devices. The prior art of optical waveguides as described in U.S. Pat. No. 5,692,088, also includes optical waveguides comprising a liquid core. Compositions of the present invention may exist in a liquid, a quasi-liquid or a solid state over a portion of their operating temperature service range. The distinctive feature of the compositions of the present invention is that they exhibit a transition in optical absorption, which may be controlled through variation in temperature. Devices that will benefit from the incorporation of the invented composition into waveguide structures include waveguide switches, programmable waveguide attenuators, and controllable waveguide shutters.

In some applications for the present invention, the electromagnetic wave propagates in an unguided free-space mode rather than in a guided waveguide mode. Projection display optics, high power laser optics, and other optical systems sometimes require neutral density filters, or controllable attenuators, or shutters which control the free-space amplitude of an optical wavefront. In the prior art, reflective/absorptive free-space elements have been fabricated using transparent liquid crystal arrays, or using microelectromechanical switch (MEMS) elements, or using electrically controlled crystal elements such as Pockels cells. In one embodiment of the present invention, a free-space attenuating screen is formed by filling the gap between two closely spaced transparent sheets of glass with the invented composition. The temperature of the composition is varied to permit switching of the state of the filter through a range of neutral density values. This approach may be carried further to allow, across the two-dimensional face of the filter, independent control of localized attenuation. In this way, the present invention could be used to realize controllable beam shavers, image pixel amplitude equalizers, holographic image attenuation controllers, and the like.

The prior art also contains many compositions in the art of manufacture of greases, gels, plastics, paints, and other compounds wherein the mechanical properties of the compositions are altered by the addition of powder thickening agents such as nanopowder silica, oxides, soaps, clays, or other materials. In some embodiments of the present invention, it may be advantageous to increase the viscosity or stiffness of the invented compositions by means of addition of these components. It is preferred in these cases to select thickening agents that do not unduly increase the level of haze in the composition. This may be accomplished, as is well known in the art of transmissive optical polymer compositions, by minimizing the effective particle size of the thickening agent, minimizing the volume fraction of the agent within the composition, and selecting agents with maximal optical clarity and with index of refraction close to that of the base composition. In like manner, fluid thickening agents such as tackifiers, or other high viscosity fluids which are miscible with the base composition and which are well known in the art of lubricant formulation may be compounded into the base composition in order to increase its viscosity and reduce its tendency to migrate or flow once it is dispensed into the optical assembly.

The prior art of compounding of greases, plastics, lubricants, and other compounds also contains knowledge regarding the addition of small percentage quantities of additives or fortifiers, such materials being included in compositions at up to 10% by weight. Additives may be either soluble or insoluble in the base fluid of the composition. Additives serve to imbue the composition with a variety of improvements in properties. An illustrative but incomplete list of types of additives is as follows: antioxidants, lubricity additives, surfactants, fluorescent dyes, absorbing dyes, electrical conductivity additives, and metal scavengers or passivators. Many such additives are available for purchase from the additive chemical supplier base. Fortifiers can include insoluble species such as oxide powders, fluorescing powders, nanotubes, nanospheres, microspheres, pigments, liquid crystals, and other materials. It is envisioned that some such additives and fortifiers could be included in compositions of the present invention provided that the key optical performance parameters for the composition such as insertion loss and extinction ratio are not unduly degraded. It is further envisioned that compositions of the present invention could be employed as a bulk medium to physically support arrangements of various fortifier species for the purpose of forming a photonic crystal, a Bragg reflector, a frequency doubling film, or numerous other photonically active materials.

The present invention permits the thermooptic control of signal amplitude in a waveguide or free space propagation configuration with substantial improvements in: ON-state insertion loss per unit length, extinction ratio per unit length, thermooptic control coefficient per unit length, insertion loss flatness, and polarization dependent loss.

The invention relies on the optical characteristics of a "cloud point" phase transition phenomenon. A "cloud point" is the property of a fluid or fluid mixture to change from clear to cloudy as it is cooled and passes through a precipitation transition. The most familiar example of this phenomenon is the transition of paraffin wax from a clear fluid in its melted state to a hazy soft solid in its solid state. In the field of petroleum fluid technology, the cloud point is a temperature at which a mixture of two or more fluids transitions from clear to hazy as one of the species precipitates out of solution as a microcrystalline wax. Since polymers generally comprise mixtures of a number of molecular weight species of related chemical structure, the cloud point transition is often not sharply defined with respect to temperature. However, by controlling the range of molecular weight within narrow limits, the transition can be sharpened, affording more dramatic thermooptic control and higher and more advantageous thermooptic control coefficient. As is known in the art of design of synthetic waxes, it is also possible to vary the nominal molecular weight of a particular type of wax such that its cloud point, and therefore the composition's nominal ON/OFF transition temperature point, can be selected to be most advantageous for a particular application. Molecular weight homogeneity of a polymer fluid or wax may be improved by techniques well known in the art of polymer manufacture such as distillation, wiped-film vacuum fractionation, supercritical fluid extraction, and the like.

It is unproven whether the thermooptic response of the present invented compositions are limited solely by the rate at which the control temperature may be varied within the composition as limited by the heat transfer design of the device employing the composition. However, it is expected that embellishments of the invented composition will serve to sharpen the thermooptic response and enable faster switching speeds. First, the range of the molecular weights of the wax portion of the composition may be controlled within narrow limits as described above. It is speculated but not proven that the addition of a small quantity of inert solid fortifier powder to the composition will provide nucleation sites for condensation of the microcrystalline wax phase of the composition, improving the speed at which the composition can transition from the ON to the OFF state. It is expected but not proven that externally applied pressure changes will also increase the thermooptic coefficient of the composition. It is envisioned that such pressure changes could be applied, for example, by passive means in a device design by arranging for the structure which encloses the invented composition to expand or contract the enclosed volume at a predetermined rate with temperature. This could be accomplished, for example, by choice of enclosing structure materials with coefficients of thermal expansion and/or controlled heating and cooling which achieve the volumetric changes needed to apply the desired static pressures.

In some applications of the present invention, it is advantageous to formulate a composition which is a high viscosity flowable fluid. This allows the material to be more easily poured or dispersed into small spaces in the optical assembly. In the preferred embodiment of the invention, a wax is dissolved in a flowable fluid to make a plasticized mixture which is highly viscous but pourable under pressure. It is opaque at room temperature and clears to be highly transmissive at temperatures above 34° C. It may be desirable that compositions of the present invention remain highly viscous throughout the OFF portion of their service temperature range. This feature serves to immobilize the precipitated wax species and prevent it from separating out as distinct phases through buoyant or agglomerative forces, thereby causing unwanted optical performance effects. On the other hand, it may also be desirable in some applications to ensure that at the extreme lower limit of its service temperature range the material retain sufficient pliability to avoid formation of fractures within the composition or delamination of the composition from surrounding substrates. It is postulated, but as yet untested, that this requirement may be equivalent to requiring that the composition contain a non-freezing fluid component which serves to plasticize the wax at cold temperatures and prevent fractures or delamination. The prefered embodiment of the invention contains such a plasticizing fluid component.

It is also possible to conceive embodiments of the optical devices of the present invention comprising solely a wax which is opaque and immobile or semi-solid at room temperature without flowability, but is flowable above its cloud point.

If the wax and fluid are chosen to be of types that have viscosity which decreases rapidly with increasing temperature, the composition may have additional advantages for manufacturing. By heating such a fluid well beyond its operating temperature, the fluid may be made low in viscosity so that it may be more easily injected into the optical device; upon being cooled to its service temperature range the fluid mixture reverts to its higher viscosity and immobile state. It is a feature of the preferred embodiment of the present invention that it has a high viscosity temperature coefficient in order to obtain this manufacturability advantage.

It is envisioned that in some applications, such as outdoor telecommunications applications where the service temperature environment reaches 85° C. or higher, that the desired cloud point transition would be set to be somewhat higher than this maximum service temperature, for example, at 90° C. This would allow the device designer to perform the thermooptic control by means of a heating element only, without the need for an active cooling element. As an example, a practical control approach would be to design the device package to operate at a continuous internal temperature of 85° C., representing the standby OFF-state. A stepped up heating state would be designed to boost the temperature to a 95° C. to switch the composition to the ON-state. To switch from ON to OFF, the stepped up heating state would be disabled, allowing the device to cool, via passive heat-sinking to ambient temperature and return the composition to the OFF-state. In other applications, where nominal ambient temperature is room temperature, a suitable cloud point transition would be chosen for the composition to be slightly above room temperature. As with the example just cited, one could use a control heater to raise the temperature to the ON-state, and rely on equilibration with ambient temperature to switch the composition to the OFF-state. It is a feature of the invented composition that within classes of appropriate polymer fluids and waxes, that a wide range of cloud point temperatures can be selected to suit a particular application. For example, with the preferred embodiment of the invention, higher and lower melting point waxes could be chosen to mix with the base clear fluid so as to move the cloud point higher or lower in temperature. Such design flexibility would be helpful, for example, if the switch state while unpowered at ambient temperature were specified to be fully OFF (sometimes called "normally open"), or fully ON (sometimes called "normally closed"). One application which would benefit from a "normally open" version of the invented composition would be a waveguide safety shutter for long haul telecommunications fiber carrying eye-damaging levels of infrared laser radiation.

The compositions of the present invention are comprised of at least one material component which has the following properties:

1) at the OFF temperature the material component (the "wax") is an optically opaque semi-solid or solid material (the "wax");

2) at the ON temperature the wax is optically clear.

A preferred embodiment of the invented compositions are those which are comprised of at least two miscible but distinct materials which have the following properties:
1) at the OFF temperature one is an optically clear fluid (the "fluid") and one is a wax;
2) at the ON temperature both materials are optically clear and they are miscible in proportions of at least 1:100 (fluid:wax) but more preferably are infinitely miscible;
3) at the OFF temperature the mixture of materials has a viscosity which is sufficiently high to prevent separation of the phases of the two materials; preferably the OFF viscosity of the mixture is at least 1000 cP, and more preferably is at least 20,000 cP.

A preferred embodiment of the invented compositions is one which is optically transmissive in the near infrared in the ON state comprising:
1) ten to ninety parts by weight of a fully halogenated, substantially bonded-hydrogen free, chlorotrifluoroethylene polymer fluid;
2) ninety to ten parts by weight of a fully halogenated, substantially bonded-hydrogen free, high molecular weight chlorotrifluoroethylene wax.

Other combinations of materials can be conceived which follow the invented prescription. For example, a thermoplastic composition which exhibits microcrystallinity below its microcrystalline transition temperature will exhibit behavior vs. temperature which mimics compositions of the present invention. In this sense, any material which exhibits a microcrystalline precipitation vs. falling temperature exhibits the properties of the "wax" component of the present invention's compositions, and can be used with optical devices of the present invention provided that such transitions are reversible and repeatable. Examples of such embodiments of the present invention would be optical devices incorporating the following: polytetrafluoroethylene compositions, polyalphaolefin compositions, paraffin wax compositions, hydrocarbon microcrystalline wax compositions, polypropylene compositions, partially or fully halogenated wax compositions, siloxane resins or fluids, polyphenylether or polyphenylthioether resins or fluids, and the like.

For the purposes of the present invention, a thermooptically active or thermooptically controllable composition is a composition which can be controlled to have an opacity which varies over a range of temperature in a well-defined, reversible, and repeatable manner between an "ON-state" which is substantially transparent and an "OFF-state" which is substantially opaque.

Unless otherwise specified, "optically clear" is taken to mean having an optical transmission of greater than 90% over a 1 mm path length at the intended "ON state" temperature and at the intended wavelength of transmission as measured using a grating spectrophotometer with an instantaneous spectral bandwidth of 10 nm or less.

Conversely, "optically opaque" is taken to mean having an optical transmission which is less than 90% at the intended "OFF state" temperature and at the wavelength of intended use.

Unless otherwise specified, "ultraviolet" is taken to mean a range of wavelengths from 100 nm to 400 nm, "visible" is taken to mean a range of wavelengths from 400 nm to 750 nm, and "near infrared" is taken to mean a range of wavelengths from 750 nm to 2000 nm.

Unless otherwise specified, "index of refraction" or "refractive index" is taken to mean the value of refractive index of a medium measured at 25+/−0.5 degrees centigrade and 589 nm, as measured by the method of Abbé refractometry according to ASTM D-1218, or equivalent method. This definition is the convention in the optics industry, even when the intended wavelength of use of the material differs from 589 nm as is the case with wavelengths in the near infrared.

Unless otherwise specified, a statement that two adjacent optical materials are "index-matched" is taken to mean that they differ in refractive index by no more than 0.06. By this definition, a fused silica fiber (refractive index=1.46) is index-matched to a composition of the preferred embodiment of the present invention (refractive index=1.42).

Unless otherwise specified, "service temperature" indicates temperature limits or ranges at which or over which the optical performance criteria are applied. The composition may also be subjected to temperatures above or below its service temperature limits, but without necessarily meeting its optical performance criteria.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

In many optically based systems, there is a need to actively control the opacity of a light-transmitting composition in order to switch off or substantially attenuate the signal. Prior art means for accomplishing this function suffer from excessive insertion loss in the ON state, inadequate extinction ratio in the OFF state, inadequate thermooptic coefficient, or inadequate insertion loss flatness vs. wavelength. The present invention is intended to improve these figures of merit for a thermooptically controlled composition and for devices incorporating such compositions. Examples of fields which would benefit from the invention are the field of telecommunication waveguide switches and waveguide attenuators, and the field of programmable neutral density filters for free-space optics.

Figure 1:
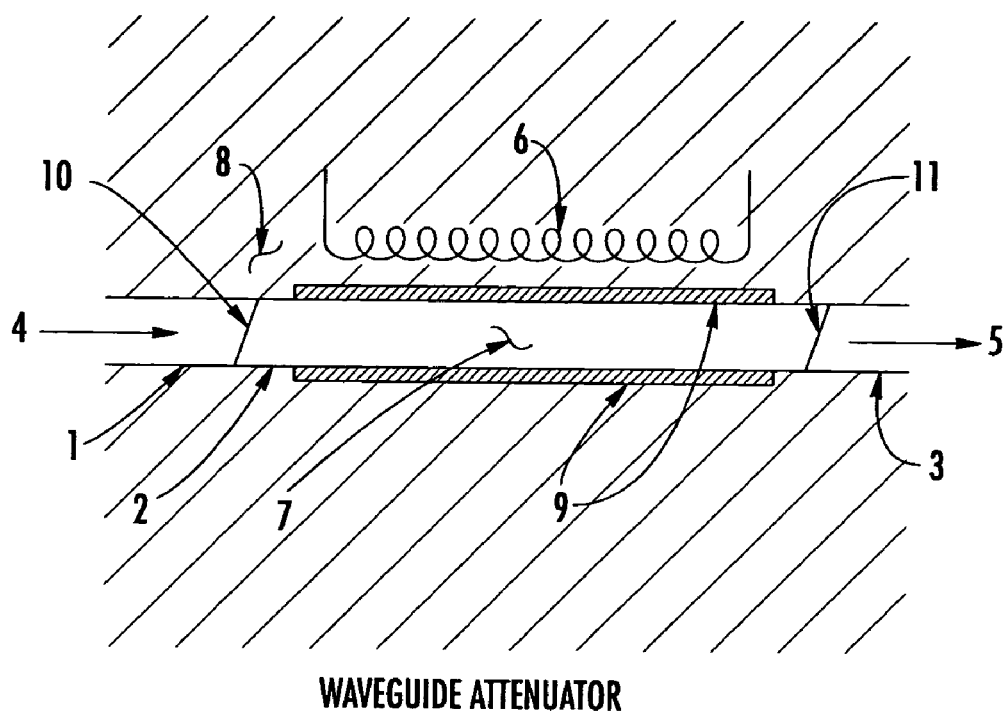
FIG. 1 is a schematic depiction of a waveguide attenuator containing a thermooptically active composition of the present invention.

An illustration of the present invention in the field of telecommunication waveguide attenuators is shown in FIG. 1. FIG. 1 depicts the geometry of a programmable waveguide attenuator for the telecommunications bands at 1300 nm and 1550 nm. The waveguide could be of the single mode or multimode type and could be straight as shown in FIG. 1, or curved. In cross-section, the waveguide could be circular, rectangular, semi-circular, or other arbitrary geometric shape as long as it supports the propagation of at least one guided electromagnetic wave mode. For example, the waveguide could be formed within a planar structure so as to have an approximately rectangular cross-section as is well known in the art of planar integrated optics. Optical fibers (1, 3) or functionally equivalent planar optical waveguide runs are used to inject a signal at the input port (4) and retrieve the signal at the output port (5). The signal passes through the thermooptically active region (2) which extends from the input fiber to active region input junction (10) to the active region to output junction (11). A heating element (6) in close proximity to the active region (2) is designed to heat the composition (7) which fills the active region (2) from its OFF-state to its ON-state. Heater control circuitry (not shown) of arbitrary design is used to energize the heating element (6). Such circuitry may simply operate in a bi-static mode giving either full ON performance, or full OFF performance. Or, the circuitry may be designed to vary continuously over fine temperature increments so as to precisely control the opacity of the composition (7), allowing the device to operate as a programmable precision attenuator. Alternatively, many such heating elements (6), individually controlled, may be placed along the length of the active region (2). In some embodiments it may be desirable to fabricate the structure of FIG. 1 within a substrate medium (8). If the substrate medium (8), chosen for convenience of available substrate materials, has a refractive index which is higher than that of the composition (7), then improved waveguide definition and signal confinement, especially at waveguide bends, will be achieved if the active region (2) is clad with an optional thin coating of material (9) with refractive index less than that of the composition (7). Many such coating materials, made from both organic polymers and inorganic materials, are available from the optical materials industry. It is also desirable in some applications that the refractive index of the composition (7) be index-matched to the refractive index of the fibers (1,3) in order to reduce Fresnel reflection at the interfaces (10, 11). However, as is well known in the art of fiber splicing and in the art of microwave and millimeter waveguide structures, the reflections can be reduced by designing interfaces (10, 11) which are modestly angled as shown in FIG. 1, stepped down in successive impedance matching steps, or even tapered over a length of many fiber diameters (not shown in FIG. 1). Another technique for overcoming imperfect index matching between the fibers (1,3) and the thermooptically active region (7), is to insert a quarter-wavelength index matching transformer in the waveguide at the interfaces (10, 11) as is well known in the art of microwave window matching transformers, and in the art of anti-reflection coatings for lenses. Alternatively, the composition in the active region (7) can be designed to be index-matched to the fibers (1,3). It will also be recognized to those skilled in the art of polymer waveguide design that compositions of the present invention, in particular the preferred embodiment composition, even if permanently operated in an ON-state, will serve as a pliable alternative to other low loss but rigid thermoplastics.

Figure 2:
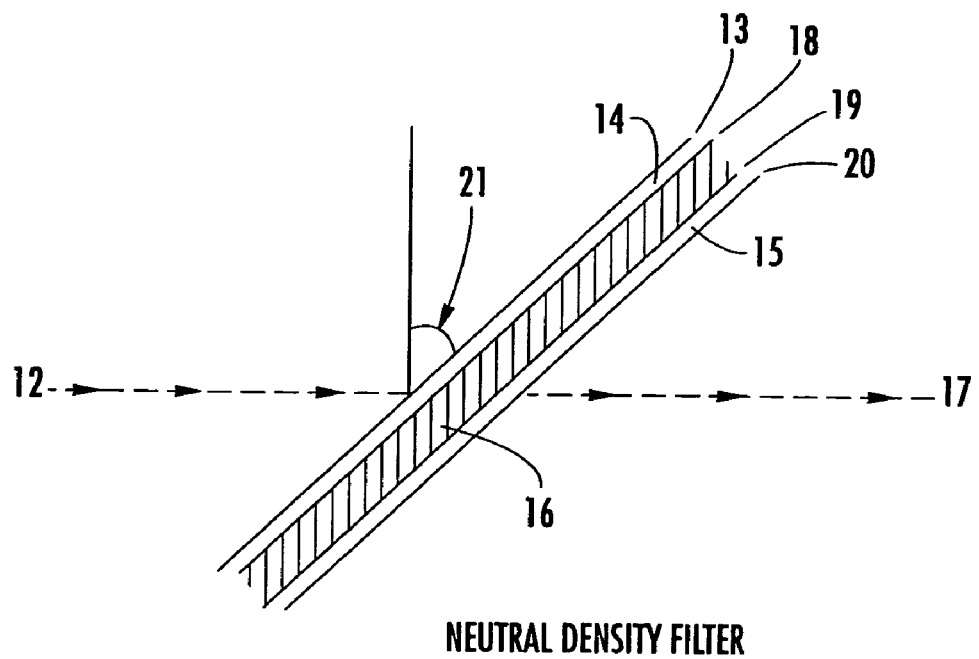
FIG. 2 is a schematic depiction of a neutral density filter containing a thermooptically active composition of the present invention.

An illustration of the use of the present invention in the field of neutral density filters is shown in FIG. 2. A free-space wave is incident from the left following the input ray path (12). It encounters the outer face (13) of the neutral density filter assembly formed by a sandwich of two planar sheets (14,15) of optical quality glass or plastic enclosing a region (16) of thermooptically active composition of the present invention. When the region (16) is thermooptically switched to its ON-state, the incident ray passes through the region (16) and then passes through the second sheet of glass (15) and continues in the direction indicated for the output ray path (17). When the region (16) is switched to its OFF-state, the amplitude of the output ray (17) is substantially decreased. If the region (16) is caused to be at a temperature which makes it partially transmissive, it will take on an intermediate neutral density state and cause a corresponding well defined attenuation of the amplitude of the output light ray (17). Various mechanisms can be envisioned for controlling the temperature of the region (16) so as to adjust its opacity. These include: raising or lowering the ambient temperature of the entire device which contains the assembly of FIG. 2, placing a transparent resistive heating grid or coating coplanar with and bonded to and across one or more of the sandwich surfaces (13,18,19,20), heating the entire sandwich assembly with an externally directed infrared lamp or laser, or heating the outer edges of the sandwich (which lie outside the zone of interaction of the free-space lightwave) by means of a heating or cooling lines or other elements.

Various embellishments of the invention of FIG. 2 will be obvious to those skilled in the art of optics, lens design and anti-reflection coatings. For example, the tilt angle (21) of the surface (13) with respect to the incident light ray can be adjusted to be at an advantageous angle. One such angle is that which allows the incident lightwave to encounter the interfaces (13,18,19,20) at or near Brewster's angle, minimizing reflections for one polarization. In another embellishment, one or more of the interfaces (13,18,19,20) are modified to have anti-reflection coatings which serve to reduce Fresnel reflections between zones of non-identical refractive index. Alternatively, instead of providing anti-reflection coatings at the interfaces (18,19), the composition used in the active region (16) can be designed to be index-matched to the optical glass or plastic materials (14, 15) which form the sandwich structure. In another embellishment the planar sheets (14,15) could individually be replaced with more complexly-shaped structures such as curved lenses. In yet another embellishment, the localized heating elements described above for heating the active medium (16) could be independently controlled to afford a control matrix of attenuation elements across the entire face of the device. Such a configuration could find use as a display image amplitude equalizer, or a holographic image amplitude equalizer. It will be further obvious to those skilled in the art of imaging technology that the invented device can be combined with other devices such as flat panel displays, planar imaging detector arrays and the like so as to impart advantageous properties to those other devices.

EXAMPLE:

Thermooptic Composition for Near Infrared Optical Components

A composition is prepared by heating the following ingredients to above 40° C.: 40% by weight of Halocarbon HC-1000N, and 60% by weight of Halocarbon Wax 600. The materials listed are available from Halocarbon Corporation, P.O. Box 661, River Edge, N.J. 07661 USA. The ingredients are mixed after heating with a stir motor or other equipment suitable for mixing high viscosity fluids. The mixture is allowed to cool to room temperature. If air or dust particles become entrained in the mixture, the composition may be reheated, filtered and deaerated using methods familiar to those in the art of ultrafiltered aerospace grease manufacture.

At room temperature, the invented compound is milky white in appearance and has a soft putty-like texture. At room temperature it does not flow or migrate at rest but can be forced to flow under pressure through a syringe or other dispensing device. When heated to well above its transition temperature, the viscosity of the composition decreases rapidly, reaching a value below 500 cP at 100° C. which is convenient for rapid dispensing into small devices in a manufacturing environment.

Figure 3:
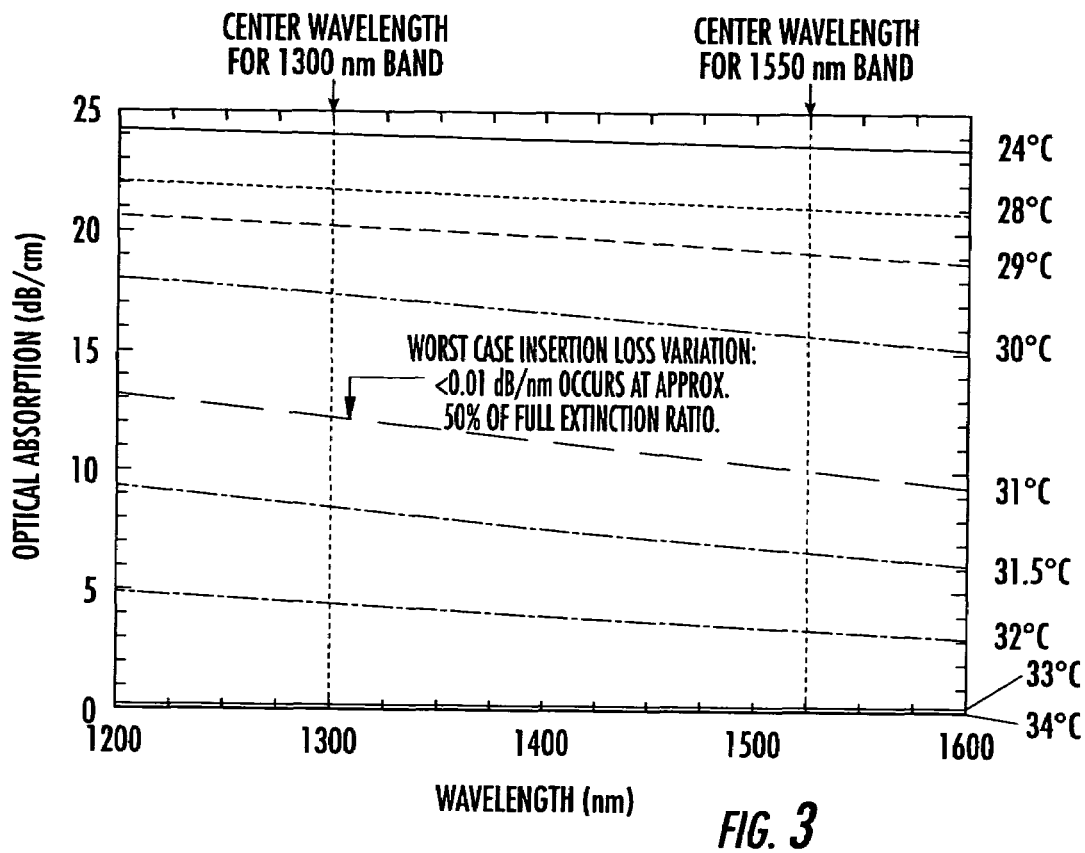
FIG. 3 is a graph comparing optical absorption vs. wavelength for the preferred embodiment composition at various temperatures.
Figure 4:
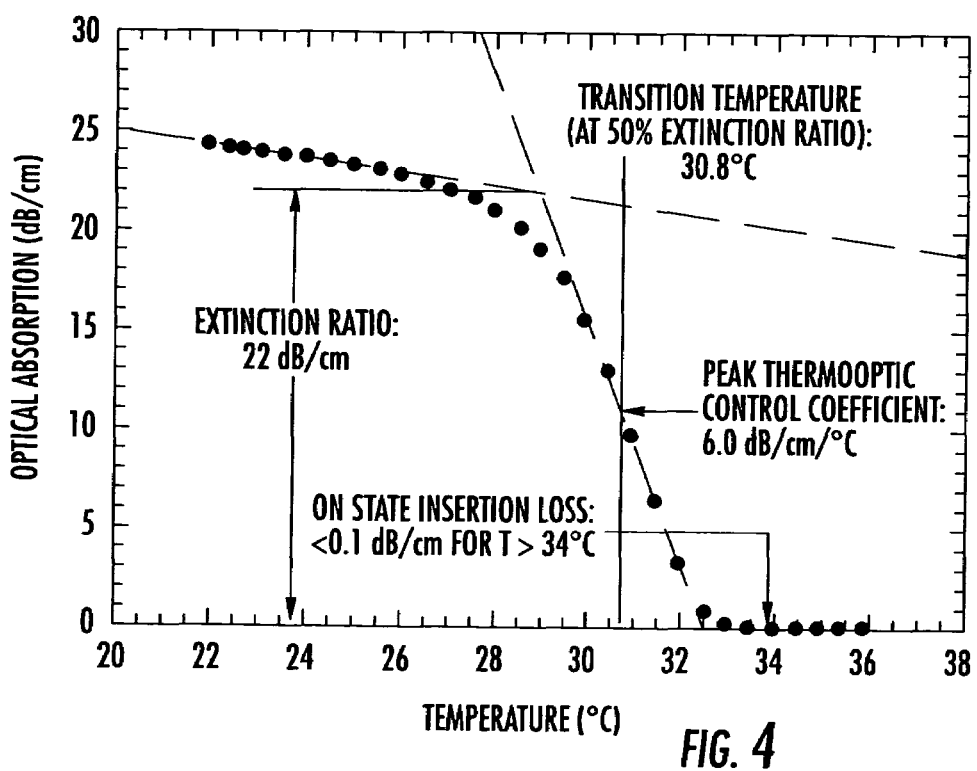
FIG. 4 is a graph comparing optical absorption vs. temperature for the preferred embodiment composition at 1550 nm.

The thermooptic behavior of this formulation is described in FIGS. 3 and 4. The optical absorption of the composition was measured using a Varian-Cary 500 grating spectrophotometer with a temperature controlled sample cuvette stage. At the OFF-state temperature of 25° C., the optical absorption was measured to be in excess of 22 dB/cm at 1550 nm. At the ON-state temperature of 34° C., the optical absorption representing the ON-state insertion loss was measured to be less than 0.1 dB/cm at 1550 nm, giving an extinction ratio of 22 dB/cm. The thermooptic coefficient was measured to be 6 dB/cm/° C. at 1550 nm as shown in FIG. 3. The insertion loss flatness is described in FIG. 4 across an operating band from 1200 nm to 1600 nm. The data show the absence of resonances or nulls, indicating that a single device comprising the composition, such as those described in FIGS. 1 or 2, could operate across the entire wavelength range. In the 1200 nm to 1600 nm band, the worst case insertion loss flatness was measured to be less than 0.01 dB/nm.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A thermooptically active composition comprising:
   10 to 90% by weight of a polymer fluid; and
   90 to 10% by weight of a wax having a low melting point, wherein said composition is thermooptically active having an OFF state at a first temperature wherein said wax is at least partially solidified and said composition is at least partially opaque and an ON state at a second temperature, said second temperature being higher than said first temperature wherein said wax is at least partially fluidized and said composition is at least partially transparent.

2. The composition of claim 1, wherein the polymer fluid is a chlorotrifluoroethylene polymer.

3. The composition of claim 1, wherein the polymer fluid is a bromotrifluoroethylene polymer.

4. The composition of claim 1, wherein the wax is a chlorotrifluoroethylene wax.

5. The composition of claim 1, wherein the wax is a bromotrifluoroethylene wax.

6. The composition of claim 1, wherein the polymer fluid is a halogenated polymer, substantially free of hydrogen-bonded species.

7. The composition of claim 1, wherein the polymer fluid is a halogenated solid which is substantially miscible in the fluid portion when melted.

8. The composition of claim 1, wherein the polymer fluid is a silicone fluid and the wax is a soluble silicone resin.

9. The composition of claim 1, wherein the fluid is a polyphenylether and the wax is a high molecular weight polymer of the same type.

10. The composition of claim 1, wherein the fluid is a polyphenylthiooxyether and the wax is a high molecular weight polymer of the same type.

11. The composition of claim 1, further comprising:
    performance additives up to 5% by weight selected from the group consisting of: anti-oxidant, absorbing dye, fluorescing dye, metal scavenger, metal passivator, acid scavenger and mixtures thereof.

12. The composition of claim 11 further comprising:
    fluid thickening agents up to 20% by weight, said fluid thickening agents being soluble in the base fluid.

13. The composition of claim 11, further comprising:
    particle thickening agents up to 50% by weight selected from the group consisting of: silicon dioxide powders, oxide powders, liquid crystals, fluorescent powders, microspheres, nanotubes, clays, metal powders, conductive polymers, chromophoric polymers, ceramic powders and mixtures thereof.

14. The composition of claim 13 further comprising:
    fluid thickening agents up to 20% by weight, said fluid thickening agents being soluble in the base fluid.

15. The composition of claim 1, further comprising:
    particle thickening agents up to 50% by weight selected from the group consisting of: silicon dioxide powders, oxide powders, liquid crystals, fluorescent powders, microspheres, nanotubes, clays, metal powders, conductive polymers, chromophoric polymers, ceramic powders and mixtures thereof.

16. The composition of claim 1 further comprising:
    fluid thickening agents up to 20% by weight, said fluid thickening agents being soluble in the base fluid.

17. The composition of claim 1, wherein the fluid is comprised of a blend of two or more miscible constituent fluids.

18. The composition of claim 1, wherein the fluid is substantially free of carbon-hydrogen bonds.

* * * * *